Figure 1:
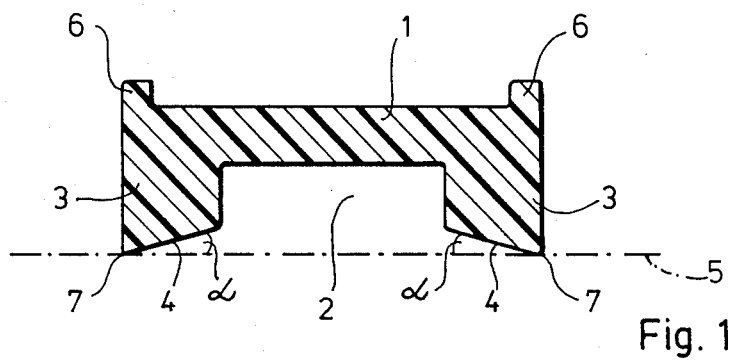

United States Patent [19]

Mack et al.

[11] Patent Number: 4,714,259
[45] Date of Patent: Dec. 22, 1987

[54] SEALING RING STRUCTURE WITH STRESSING RING

[75] Inventors: Theo Mack, Leinfelden-Echterdingen; Roy Edlund, Stuttgart, both of Fed. Rep. of Germany

[73] Assignee: Busak + Luyken GmbH & Co., Fed. Rep. of Germany

[21] Appl. No.: 38,956

[22] Filed: Apr. 16, 1987

[30] Foreign Application Priority Data

Apr. 24, 1986 [DE] Fed. Rep. of Germany ....... 3613880

[51] Int. Cl.⁴ .............................................. F16J 15/24
[52] U.S. Cl. .................................. 277/165; 277/188 R; 277/214
[58] Field of Search ........... 277/152, 165, 214, 188 A, 277/188 R

[56] References Cited

U.S. PATENT DOCUMENTS

| | | | |
|---|---|---|---|
| Re. 28,105 | 8/1974 | Traub | 277/165 |
| 2,784,013 | 3/1957 | Groen | 277/165 |
| 3,033,578 | 5/1962 | Kellogg | 277/78 |
| 3,268,235 | 8/1966 | Jacobellis | 277/214 X |
| 4,179,131 | 12/1979 | Nussbaumer | 277/188 R X |
| 4,239,242 | 12/1980 | Burns | 277/165 X |

FOREIGN PATENT DOCUMENTS 2057027 5/1972 Fed. Rep. of Germany.
G8325499.4 1/1984 Fed. Rep. of Germany.
2096247 10/1982 United Kingdom.

*Primary Examiner*—Robert S. Ward
*Attorney, Agent, or Firm*—Kanz, Scherback & Timmons

[57] ABSTRACT

In a sealing ring structure comprising a sealing ring (1) made of a tough-elastic plastic material and a stressing ring (11) made of a rubber-elastic material, the sealing ring (1) is provided with an annular recess (2) on its sealing surface which rests against the other machine component (14). The stressing ring (11) is arranged in the sealing ring (1) approximately centrically relative to the said recess so that the force of the stressing ring (11) is distributed over the two end portions of the sealing ring (1) defining the recess (2). Any dimensional deviations resulting from tolerances or temperature changes are compensated by smaller or greater deflection of the central portion of the sealing ring (1), without notable changes to the surface pressures encountered between the sealing ring (1) and the sealing surface (15) which are essential for the proper operation.

6 Claims, 2 Drawing Figures

SEALING RING STRUCTURE WITH STRESSING RING

The present invention relates to a sealing ring structure comprising a sealing ring made of a tough-elastic plastic material fitted into the groove of one of two machine elements moving relative to each other, and a stressing ring made of a rubber-elastic material arranged between the said sealing ring and the bottom of the groove and loading the sealing ring in the radial direction, the axial extension of the said stressing ring being considerably smaller than that of the sealing ring and its axial position, relative to the sealing ring, being fixed by means of stops in such a manner that the sealing ring is loaded in the area of an edge.

Sealing ring structures of the described type have been known before in different designs. German Disclosure Document No. 20 57 027 describes, for example, a hydraulic seal comprising a cylindrical sealing ring and a rubberelastic stressing ring which has its center arranged above one end of the cylindrical sealing ring so that it loads that end unilaterally. The section of the stressing ring projecting beyond the sealing ring is supported by a, preferably, rigid supporting ring which does not perform any sealing functions. If this seal is to give perfect performance, it is necessary that very close tolerances be adhered to as regards the diameters of the sealing and the supporting rings relative to each other and also in relation to the diameter of the sealing surface, i.e. the diameter of the rod or shaft to be sealed.

From U.S. Pat. No. 3,033,578, a sealing arrangement has been known where the ends of a substantially cylindrical sealing ring are loaded each by one O ring. The two O rings coacting with the sealing ring are separated by a web of the component receiving the sealing arrangement. The two stressing rings are arranged centrically relative to the annular portions of the sealing ring which are in contact with the sealing surface and separated from each other by grooves. A seal of this type also requires that very close tolerances be adhered to if acceptable sealing results are to be maintained for a reasonable period of time.

Now, it is the object of the present invention to provide a sealing ring structure of the type described above which can be produced with larger tolerances than was possible heretofore and which nevertheless ensures perfect sealing results. This object is achieved according to the invention by an arrangement in which that sealing surface of the sealing ring which rests against the other machine component comprises an annular recess and in which the stressing ring is arranged approximately centrically relative to the said recess.

Contrary to the known seals, the stressing ring of the sealing structure according to the invention, therefore, acts upon an area of the sealing ring located between those areas of the sealing ring which rest against the sealing surface. Depending on the production tolerances the sealing ring, therefore, is permitted to deflect more or less without thereby affecting considerably the contact pressure exerted upon the sealing surface by the edges of the sealing ring which define the portions of the sealing ring on either side of the recess. Under operating conditions, the sealing structure according to the invention, therefore, ensures substantially constant contact pressure which is maintained even when dimensional changes occur due to temperature variations during operation of the sealing structure.

It is understood that the contact pressures achievable by the seal according to the invention depend of course on the flexural stiffness of the tough-elastic plastic material of the sealing ring. Consequently, this seal can be used with advantage only for moderate pressures of up to approximately 150 bar. However, up to this moderate pressure range, the seal according to the invention provides a low-friction seal for pneumatic and hydraulic applications which is insensitive to tolerance and temperature changes and which distinguishes itself by perfect sealing performance and long service life.

According to a preferred embodiment of the invention, the surface portions adjacent the annular recess are of conical shape so that in the relaxed condition the sealing ring is in contact with the other machine component by the edges adjacent its outer end faces. As the pressure and, thus, the deflection of the sealing ring rises, an increasing portion of the conical surfaces comes into contact with the other machine portion, while at the same time the pressure at the outer edges increases. Both the rising pressure at the outer edges and the rising surface pressure in the area extending right to the inner recess lead to an improvement of the sealing effect as the pressure rises.

In order to avoid a condition where in the course of a further increase of the pressure the sealing ring comes to rest against the other machine component by the edges of the sealing surface adjacent the inner recess while the outer edges are lifted off, the sealing ring may be provided on its ends with webs projecting beyond the surface loaded by the stressing ring and resting against the bottom of the groove so as to prevent the sealing ring from giving way and to form abutments which contribute towards increasing the contact pressures. This increases the pressure loading capacity of the sealing structure according to the invention still further.

The stressing ring may be fixed relative to the sealing ring in different manners. It would be possible, for example, to fit supporting rings in the groove receiving the sealing ring and the stressing ring, on both sides of the latter. However, it is also imaginable to provide the side of the sealing ring facing the stressing ring with another recess serving to receive the stressing ring. However, this may lead to the stressing ring exerting upon the sealing ring axial forces that could influence its function in a disadvantageous manner. A preferred embodiment of the invention, therefore, provides that the groove receiving the sealing ring and the stressing ring is provided at its center with a recess which is engaged by the stressing ring. This ensures that the position of the stressing ring is determined perfectly and that only radially acting stressing forces, as required for the perfect operation of the sealing structure, are transmitted to the sealing ring.

The invention will be described hereafter in detail with reference to the example illustrated in the drawing. The features shown in the drawing may be used in other embodiments of the invention either individually or in any desired combination thereof. In the drawing FIG. 1 shows a cross-section through the sealing ring of a sealing structure according to the invention, in relaxed condition, and FIG. 2 shows a sealing structure according to the invention using the sealing ring illustrated in FIG. 1.

Figure 2:
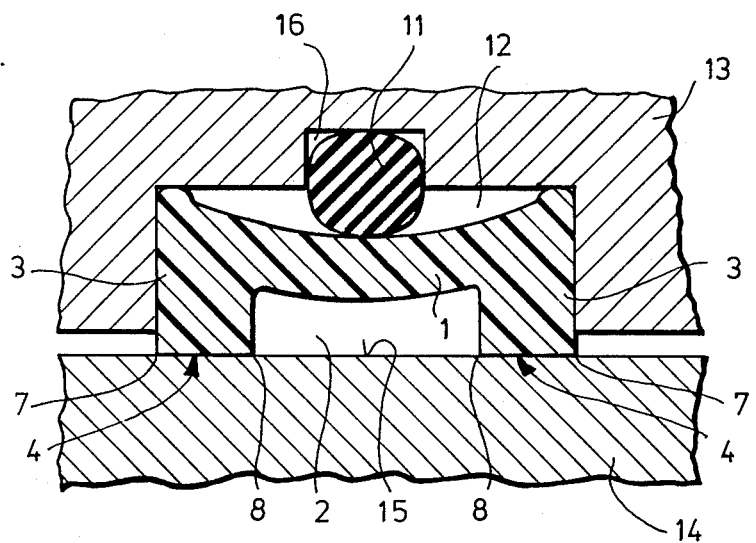

FIG. 1 shows the cross-section of a sealing ring in relaxed condition. The sealing ring 1 consists of a tough-elastic plastic material, for example a material on a PTFE or polyurethane basis. Its cylindrical main body is provided on one side with a central recess 2. The legs 3 defining the recess 2 exhibit inclined end faces 4 defining with a concentrical cylindrical surface 5, which is in contact with the ends of the legs 3, an angle α opening towards the recess 2. The other side of the sealing ring carries on its ends two webs 6.

For forming a sealing structure, the sealing ring 1 is mounted, together with a rubber-elastic stressing ring 11, in the groove 12 of one of two components 13, 14 to be sealed relative to each other so that the end faces 4 on the ends of its webs 3 are in contact with the sealing surface 15 of the other component 14. The groove 12 is sized in such a manner that the sealing ring 1 is received in the groove with little axial play and has its webs 6 in contact with the bottom of the groove 12. The rubber-elastic stressing ring 11 engages a recess 16 provided in the central area of the groove 12. The rubber-elastic stressing ring 11 is a simple O ring. The diameter of the stressing ring 11 is smaller than the axial length of the recess 2 in the sealing ring 1 so that the stressing ring 1 does not act upon a rigid abutment, but rather on an unsupported area of the sealing ring. Consequently, the sealing ring 1 deflects as indicated in FIG. 2. The degree of deflection may be sufficient to bring the inclined faces 4 on the ends of the legs 3 into contact with the sealing surface 15 of the other component 14, a condition which is also indicated in FIG. 2.

The contact pressure between the end faces 4 of the legs 3 and the sealing surface 15 is determined substantially by the stressing force of the stressing ring 11, which is largely independent of minor differences in diameter. Accordingly, this contact pressure is independent of tolerances in the diameter of the other machine component 14 and also of the inner diameter of the recess 16 and the outer diameter of the sealing ring. On the other hand, given the fact that the portions of the sealing ring which are in contact with the machine component 14 are resilient in radial direction, the sealing ring itself is also capable of adapting itself easily to different diameters of the other machine component 14. As a result, the sealing arrangement according to the invention is relatively insensitive to production tolerances. And its operation also is not impaired by dimensional changes due to temperature variations which makes the seal according to the invention excellently suited, in particular, for applications where important temperature variations are encountered.

Starting out from the relaxed condition shown in FIG. 1, and referring to the cross-section of the ring, the deformation of the sealing ring 1 commences by a tilting movement about the edges 7 of the sealing ring until the end faces 4 rest flat against the sealing surface 15, as shown in FIG. 2. Any further deflection of the central portion 1 would create a tendency for the sealing ring to tilt about its inner edges 8, and this in turn would cause the sealing ring to get out of contact with the sealing surface 15 in the area of its outer edges 7—an effect which is rather undesirable. This effect is avoided in the embodiment shown by the webs 6 provided on the ends of the sealing ring and resting against the bottom of the groove 12 thereby preventing any undesirable deformation of the sealing ring.

The invention is of course not limited to the embodiment shown; rather, many deviations are possible without leaving the scope of the invention. In the simplest of all cases, the sealing ring may be a cylindrical body provided only with a central recess, but having no outer webs on its ends and no inclined surfaces on the ends of the legs. It is, however, also imaginable to arrange the conical surfaces in such a manner that they include between them an outwardly opening angle so that in the relaxed condition the sealing ring rests against the sealing surface by the edges defining the annular recess. The angle α included between the sealing surface and the surface of the seal may be in the range of approximately $-15°$ to $+15°$. The recess serving to receive the stressing ring may be formed also by a deeper groove in which two supporting rings are arranged on either side of the stressing ring. Further, it is understood that a sealing structure according to the invention may be arranged either on the periphery of a piston or in a component serving for supporting and guiding a rod. The seal according to the invention is also excellently suited for use as an oil seal. Finally, it may also be used for sealing off fluids of any type. In particular, it is suited as seal for both pneumatic and hydraulic systems.

We claim:

1. Sealing ring structure comprising a sealing ring made of a tough-elastic plastic material fitted into the groove of one of two machine elements moving relative to each other, and a stressing ring made of a rubber-elastic material arranged between the said sealing ring and the bottom of the groove and loading the sealing ring in the radial direction, the axial extension of the said stressing ring being considerably smaller than that of the sealing ring and its axial position, relative to the sealing ring, being fixed by means of stops in such a manner that the sealing ring is loaded in the area of an edge, wherein that sealing surface of the said sealing ring which rests against the other machine component comprises an annular recess and the said stressing ring is arranged approximately centrically relative to the said recess.

2. Sealing ring structure according to claim 1, wherein the surface portions adjacent the said annular recess are of conical shape so that in the relaxed condition the said sealing ring is in contact with the other machine component by the edges adjacent its outer end faces.

3. Sealing ring structure according to claim 1, wherein the said sealing ring is provided on its ends with webs projecting beyond the surface loaded by the said stressing ring and resting against the bottom of the said groove.

4. Sealing ring structure according to claim 1, wherein the said groove receiving the said sealing ring and the said stressing ring is provided at its center with a recess which is engaged by the said stressing ring.

5. Sealing ring structure according to claim 2, wherein the said sealing ring is provided on its ends with webs projecting beyond the surface loaded by the said stressing ring and resting against the bottom of the said groove.

6. Sealing ring structure according to claim 5, wherein the said groove receiving the said sealing ring and the said stressing ring is provided at its center with a recess which is engaged by the said stressing ring.

* * * * *